United States Patent [19]

Hattori

[11] Patent Number: 4,943,860
[45] Date of Patent: Jul. 24, 1990

[54] THREE-DIMENSIONAL PHOTOGRAPHING AND THREE-DIMENSIONAL PLAYBACK DEVICE BY SPATIAL TIME-SHARING METHOD

[76] Inventor: Tomohiko Hattori, 6-12, Daikou-cho 3-chome, Highashi-ku, Nagoya-shi, Aichi-ken, Japan

[21] Appl. No.: 329,824

[22] Filed: Mar. 28, 1989

[30] Foreign Application Priority Data

Apr. 1, 1988 [JP] Japan .................................. 63-81480

[51] Int. Cl.$^5$ ............................................. H04N 13/00
[52] U.S. Cl. ......................................... 358/88; 358/91
[58] Field of Search ...................... 358/88, 89, 90, 91, 358/92, 3; 350/144

[56] References Cited

U.S. PATENT DOCUMENTS 4,367,486 1/1983 Eichenlaub ........................... 358/88

Primary Examiner—James J. Groody
Assistant Examiner—Victor R. Kostak
Attorney, Agent, or Firm—Cushman, Darby & Cushman

[57] ABSTRACT

A three-dimensional photographing and three-dimensional playback device by spatial time-sharing method has a taking section having a convex lens, an image pickup screen spaced from the convex lens at a distance equal to the focal length of the convex lens, and a pin hole movable on a surface of the convex lens, and a playback section having a cylindrical lens, an image output screen spaced from the cylindrical lens at a distance equal to the focal length of the cylindrical lens, and a vertical slit movable on a surface of the cylindrical lens. The pin hole in the taking section and the vertical slit in the playback section are scanned in synchronization whereby any image can be photographed and played back three-dimensionally without using any special instrument such as polarized glasses, etc.

4 Claims, 8 Drawing Sheets

SYNCHRONIZED SCANNING

THREE-DIMENSIONAL PHOTOGRAPHING AND THREE-DIMENSIONAL PLAYBACK DEVICE BY SPATIAL TIME-SHARING METHOD cially good result", means "possible", Δ means "sometimes possible" and X means "impossible".

TABLE 1

| Kind of 3D images | Glasses | Playback of landscape | Watching by plural persons | Movement of viewpoint | Coloring | Animation | Mass production |
|---|---|---|---|---|---|---|---|
| Binocular 3D images | | | | | | | |
| Anaglyph method | Necessary | | O | X | X | O | O |
| Density difference method | Necessary | O | O | X | O | O | O |
| Polarization method | Necessary | O | O | X | O | O | O |
| Time-sharing method | Necessary | O | Δ~O | X | O | O | O |
| No glasses method | Unnecessary | O | X | X | O | O | Δ |
| Real 3D images | | | | | | | |
| Multiplex method (Integral method) | Unnecessary | O | X~Δ | Δ | O | O | Δ |
| Spatial modulation | Unnecessary | X | Δ | O | O | Δ | Δ |
| Holography | Unnecessary | X | O | ⊚ | X~O | X~O | X |

BACKGROUND OF THE INVENTION

1. Field of the Invention

The present invention relates to a three-dimensional photographing and three-dimensional playback device by spatial time-sharing method, which enables the three-dimensional photograhing in equipments using optical fiber cables, such as three-dimensional TV receivers for domestic use, three dimensional TV telephone sets, or medical devices for producing three-dimensional images, and which also enables the three-dimensional playback in the above equipments without using any special instrument such as special glasses.

2. Description of the Prior Art

Conventional methods for three dimensional photographing and playback devices include methods using special polarized glasses or shutter glasses such as Anaglyph method, a denisty difference method, a polarization method and a time sharing method, methods without using glasses such as a parallax stereogram, a lenticular method, a large concave mirror method and a large convex lens method, multiplex methods such as a parallax stereogram, integral method and lenticular method which are formed as multiplex TV using lenticular plates, spatial modulation such as a varifocal-mirror method, a rotary cylinder method, a screen laminating method a half-mirror synthesizing method and a screen vibrating method; holography such as laser playback holography, and white light hologram. These various methods have been proposed in this field.

It has been attempted to put these methods to practical use for domestic use or business use. In broadcasting media, Anaglyph method using red and blue glasses, and density difference method using Pulfrich effect were tried, but because of the drawbacks that special glasses are required or viewpoint cannot be moved, these methods are difficult to be put to practical use.

The features of the conventional methods are listed in Table 1. As shown in Table 1, other methods than the glass methods also have drawbacks that an image screen cannot be observed simultaneously by plural persons or the devices are not suited to mass production. Therefore, until now a three-dimensional photographing and three-dimensional playback device which can be practically used for domestic use or business use has not been still realized. In Table 1, ⊚ means "possible with espe-

SUMMARY OF THE INVENTION

An object of the present invention is to provide a three-dimensional photographing and three-dimensional playback device which enables the simultaneous observation of an image by plural persons, and the movement of a viewpoint without using special glasses, and is suited to mass production.

To accomplish the above object, in the spatial time-sharing type three-dimensional photographing and three-dimensional playback device according to the present invention, the distance between a convex lens in a taking section and an image pickup screen is made equal to the focal length of the convex lens and there is provided a pin hole movable along the surface of the convex lens or through the inner part thereof. And a lens member selected out of a cylindrical lens and a convex lens is disposed in front of an image output screen in a playback section so that the distance between the lens member and the image output screen is made equal to the focal length of the lens member. Further, there is disposed a narrow opening member selected out of a vertical slit or a pin hole, which is movable along the surface of the lens member in the playback section or through the inner part thereof. By synchronized scanning of the pin hole in the taking section and the narrow opening member in the playback section, any image can be photographed and played back three-dimensionally without using any special instrument such as polarized glasses, etc. The three-dimensional playback of landscape pictures or animation pictures is possible, and simultaneous observation of an image by plural persons is also possible. Moreover, it is also possible to obtain different images by moving the viewpoint as if an actual object were seen from different angles.

In this device, monochromatic light or color difference is not utilized so that the device can deal with color information. The structure of the device is simple and conventional equipments and parts can be utilized so that the mass production of the device is easy.

In Table 2, the features of the spatial time-sharing type three dimensional photographing and three-dimensional playback device according to the present invention are listed in comparison with those of conventional devices.

The device of the present invention solves all the drawbacks of conventional device. The present invention is an excellent invention applicable not only to three-dimensional TV receivers for domestic use but also to three-dimensional TV telephone sets, medical devices of three-dimensional purposes, and various equipments in many other fields.

TABLE 2

| Kind of 3D images | Glasses | Playback of landscape | Watching by plural persons | Movement of viewpoint | Coloring | Animation | Mass production |
|---|---|---|---|---|---|---|---|
| Binocular 3D images | | | | | | | |
| Anaglyph method | Necessary | O | O | X | X | O | O |
| Density difference method | Necessary | O | O | X | O | O | O |
| Polarization method | Necessary | O | O | X | O | O | O |
| Time-sharing method | Necessary | O | Δ~O | X | O | O | O |
| No glasses method | Unnecessary | O | X | X | O | O | Δ |
| Real 3D images | | | | | | | |
| Multiplex method (Intregral method) | Unnecessary | O | X~Δ | Δ | O | O | Δ |
| Spatial modulation | Unnecessary | X | Δ | O | O | Δ | Δ |
| Holography | Unnecessary | X | O | ◉ | X~O | X~O | X |
| Spatial time-sharing method (The present invention) | Unnecessary | O | O | ◉ | O | O | O |

BRIEF EXPLANATION OF THE DRAWINGS

FIGS. 1 through 8 illustrate an embodiment of a spatial time-sharing type three-dimensional photographing and three-dimensional playback deice according to the present invention:

DETAILED DESCRIPTION OF THE EMBODIMENTS

Hereinafter, embodiments of the present invention will be explained with reference to the drawings.

Figure 1:
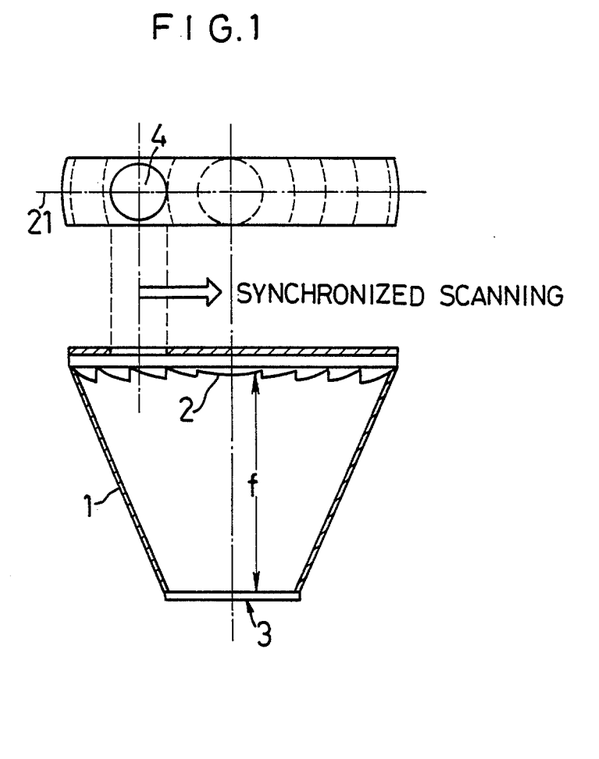
FIG. 1 is a view illustrating a taking member which is a principal part of a taking section.
Figure 2:
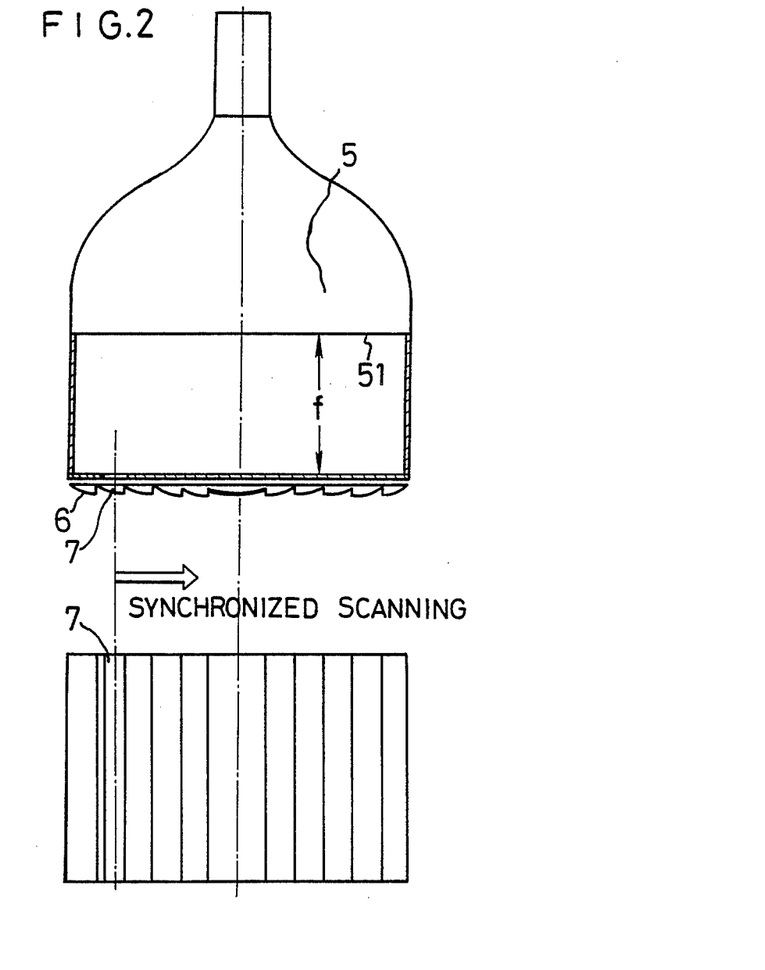
FIG. 2 is a view illustrating a playback member which is a principal part of a playback section.

FIG. 1 illustrates a taking section of a three dimensional photographing and three-dimensional playback device by spatial time-sharing method of the present invention, and FIG. 2 illustrates a playback section of the device.

As shown in FIG. 1, a taking member 1 comprises a Fresnel convex lens 2 fixed on an opening to cover it, and an image pickup screen S disposed behind the convex lens 2. The distance between the convex lens 2 and the image pickup screen 3 is made equal to the focal length f of the convex lens 2. In front of the surface of the convex lens 2 is closely disposed a pin hole 4. The pin hole 4 is formed movably in the horizontal direction, passing a central axis 21 of the convex lens 2 and is arranged to be scanned in synchronization with a vertical slit 7 in the playback section to be explained later. As shown in FIG. 1, it is preferable that the convex lens 2 has a large diameter.

As shown in FIG. 2, a large sized convex cylindrical lens 6 is disposed in front of an image output screen 51 of a CRT(cathode ray tube) 5 of the playback section. The distance between the lens 6 and the output screen 51 of the CRT 8 is made equal to the focal length f of the cylindrical lens 6. On the back of the cylindrical lens 6 is disposed the vertical slit 7 in close contact with the cylindrical lens 6. The slit 7 is arranged to be movable in the horizontal direction on the surface of the lens 6. When the photographing or playback is done, the slit 7 is scanned in the horizontal direction in synchronization with the pin hole 4 of the convex lens 2.

The convex lens 2 of the taking section and the cylindrical lens 6 of the playback section are of a large size, respectively, so that they are formed into a Fresnel lens, respectively, in order to reduce their weight and cost.

An electro-optical device such as PLZT[(Pb, La)(Zr, Ti)O$_3$]or a liquid crystal plate is used for the pin hole 4 and the vertical slit 7 when moving parts are required to be eliminated from the whole system.

The operation of the present invention constituted as described above will be explained in accordance with a system shown in FIG. 3.

Figure 3:
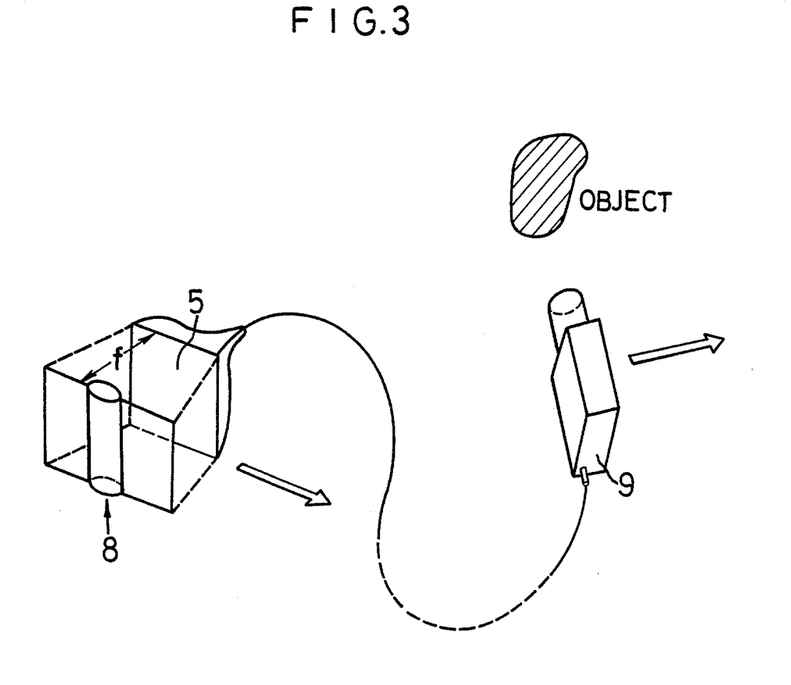
FIG. 3 is an overall view showing a principal part of the present invention.

There are shown in FIG. 3, a taking section comprising a thin and long cylindrical lens 8 fixed in front of the CRT 5 coaxially therewith at a distance equal to the focal length of the lens 8, a playback section comprising a TV camera 9 for general us, and a scanning section for scanning the above two sections in synchronization. This system is considered to be equivalent to the system shown in FIGS. 1 and 2 in taken images by the following reasons.

Figure 4:
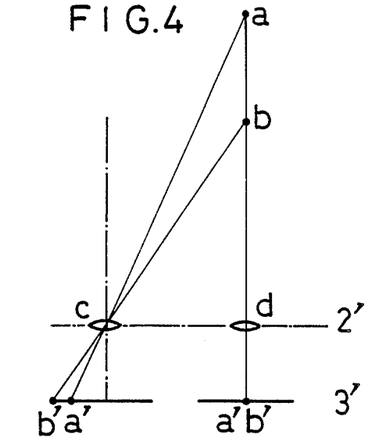
FIG. 4 is a plan view of optical paths in the taking section shown in FIG. 3.

FIG. 4 shows the taking section in the system shown in FIG. 3. There are shown in FIG. 4 convex taking lens 2' and the image pickup screen 3' instead of the TV camera 9 in FIG. 3.

Figure 5:
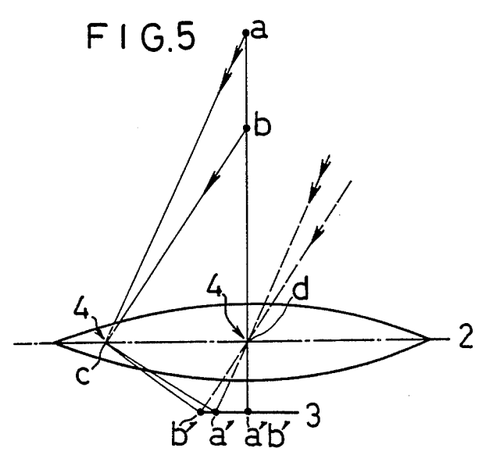
FIG. 5 is a plan view of optical paths in FIG. 1.

FIG. 5 shows the taking section of the system shown in FIG. 1. The effective center of the Fresnel convex lens 2 lies on the mowing plane of the pin hole 4, so that it is assumed in the drawing that the pin hole 4 moves along the horizontal line which passes the center d of the convex lens 2.

It is assumed in FIGS. 4 and 5 that light is radiated from points a and b. In FIG. 4, rays incident on the convex lens 2′ located at the point c are projected on the image pickup screen 3′ at points a′ and b′ on extension lines of ac and bc. In FIG. 5, the image pickup screen 3 is situated apart from the convex lens 2 by the distance equal to the focal length of the convex lens 2 so that rays from the points a and b incident on the convex lens 2 from the pin hole 4 situated at the point o are focused on the image pickup screen 3 at points a′ and b′ on which are projected rays passing through the optical axis of the convex lens 2 in parallel with rays from the points a and c as shown by broken lines in the drawing.

When the convex lens 2′ in FIG. 4(or the pin hole 4 in FIG. 5) is situated on the point d which is on the extension of a line passing through the point a and point b, rays from the point a and the point b are projected on the intersecting point of the optical axis of the convex lens 2(or 2′ in FIG. 5) and the image pickup screen 3(or 3′ in FIG. 8). This results in the relative positional relation between the optical axis and the image pickup screen in FIG. 4 being the same as that in FIG. 5. In FIG. 4, both the convex lens 2′ and the image pickup screen 3′ are moved, but in FIG. 5 onlY the pin hole 4 is moved. However, the position of the point c and its image projected on the image pickup screen 3′ in FIG. 5 are the same as those in FIG. 4. In this case, it is assumed that the point c is moved on a straight line cd.

Figure 6:
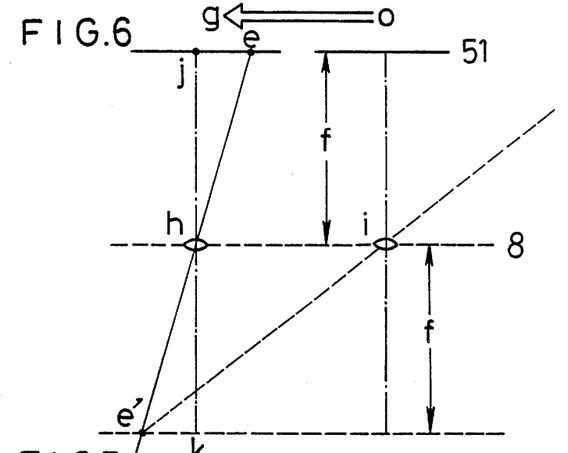
FIG. 6 is a plan view of optical paths in the playback section shown in FIG. 3.
Figure 7:
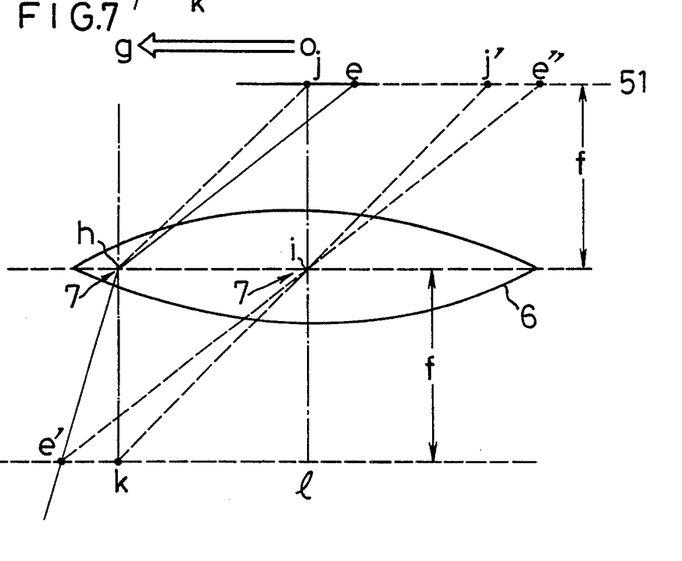
FIG. 7 is a plan view of optical paths in FIG. 2.

FIG. 6 shows the playback section of the system shown in FIG. 3. FIG. 7 shows the playback section of the system shown in FIG. 2. In both FIGS. 6 and 7, o designates the original position, and g designates the position scanned in synchronization with the taking section. And e designates a point on the output screen 51 of the CRT in both drawings. In FIG. 7, the path of the ray from the point e passing through the slit 7 located at the point h is along a stright line he′ where e′ is an intersecting point of a plane situated apart from the cylindrical lens 6 at a distance equal to the focal length of a cylindrical lens 6, and the optical path of the ray which is parallel with the line eh and passes through the slit 7 situated at the point i on the optical axis of the cylindrical lens 6. In FIG. 6, letting the intersecting point of a plane situated apart from the cylindrical lens 8 at a distance equal to the focal length of the cylindrical lens 8 and the optical path eh be e′, e′ can be expressed by the following equation, since $\Delta$he′k and $\Delta$hej are congruent;

$$e'k = ej \quad (1)$$

In FIG. 7, a point j′ satisfying the equation of je=j′e″ is selected. Because j is at the center of the image output screen 51, the light emitted from j is projected on k. Because eh//e″i and jh//j′i, the line j′ik is a straight line. And ji=il=f, so that $$j'e'' = e'k = ej \quad (2)$$

In FIGS. 6 and 7, hk=f and an angle hke′ is a right angle. According to the equations (1) and (2) $\Delta$hke′ in FIGS. 6 and 7 is congruent with each other. Therefore, the playback light emitted from e and passing the slit 7 situated at the point h, is projected on the same point on the output screen 51 of the CRT in both FIGS. 6 and 7.

In this case, the point h is assumed to move on the straight line hi.

Therefore, the system shown in FIG. 3 and the system shown in FIGS. 1 and 2 are equivalent to each other with respect to a photographed image.

Figure 8:
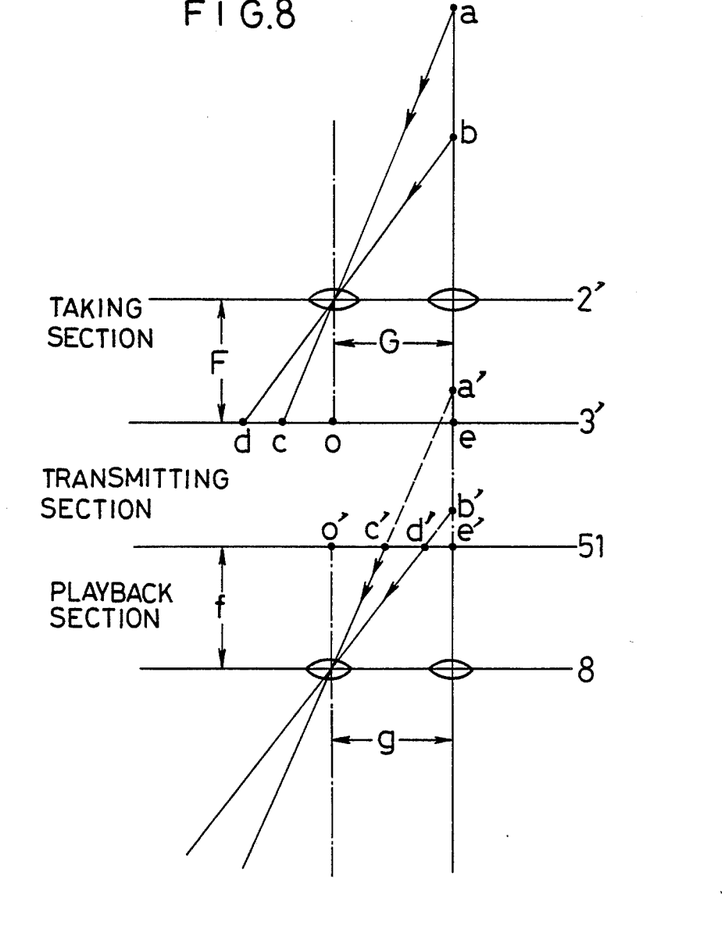
FIG. 8 is a plan view of optical paths in the taking section and the playback section in FIG. 3.

Hereinafter, the operaton of the present invention will be explained in accordance with the system shown in FIG. 3. FIG. 8 shows optical paths of the system shown in FIG. 3. Assuming that light is radiated from two points a and b located at different depths, the images of point a and point b are projected on the image pickup screen 3′ at points c, d and e according to the position of the convex lens 2′. On the output screen 51 of the CRT. an inverted image of that on the image pickup screen 3′ is projected, so that assuming that when the optical axis of the convex lens 2′ in the taking section is situated on the line passing the point e and the point o, and the optical axis of the cylindrical lens 8 in the playback section is situated on the line passing the point e′ and the point o′, the points c, d and e are projected on the CRT output screen 51 at c′, d′ and e′. The light is reproduced in such a way that as if points a and b were situated at points a′ and b′, where a′ and b′ are points of intersection of extended lines passing the center of the cylindrical lens 8 and the point c′ and d′. and an extended line passing the center of the cylindrical lens 8 and the point e′.

By using the following equations (3) and (4):

$$\Phi = a'b'/ab \quad (3)$$

$$a'b' = g(f/o'c' - f/o'd')$$

$$ab = G(F/oc - F/od) \quad (4)$$

the depth distortiion can be expressed as follows:

$$\Phi = fg(1/o'c' - 1/o'c')/\{F G (1/oc - 1/od)\}$$
$$= fg(o'd' - o'c') oc, od/\{F G (od - oc) o'c'o'd'\}$$

If o′d′ is equal to k od, can be exprssed by the following equation $$\Phi = (1/k)f g/(F G) \quad (5) \text{ ps}$$

The equation indicating the condition, ac//a′c′, bd//b′c′ in FIG. 8 is $$f = k F \quad (6)$$

Under this condition, the magnification of the vertical component of an output image is proportional to k and F. And the magnification of the horizontal component of the output image is proportional to g and 1/G. By varying k, F, g, or G under the condition of the equation (6), the vertical and horizontal distortion of the output image can be adjusted. And also, the depth distortion $\Phi$, that is the depth component of the output image, can be adjusted according to the equation (5). By substituting the equation (6) for the equation (5), the following equaton (7) is obtaind.

$$\Phi = g/G \quad (7)$$

As for the frequency of the synchronized scanning of the taking section and the playback section, 60 Hz is preferable to avoid flicker of image. Supposing that horizontal resolution of 500 lines is required on the screen in order to constitute an image per one scanning, picture elements of 60×500 frames/sec are necessary. The present TV system has a frequency band of $4\times 10^6$ Hz and reproduces 60 frames/sec so that the frequency band required for this three-dimensional photographing and three-dimensional playback device by spatial time-sharing method is about $$(500\times 60/60)\times 4\times 10^6 \ (Hz) = 2\times 10^9 \ (Hz)$$

The transmission of information of this order of frequency band is possible by the use of an optical fiber cable.

Figure 9:
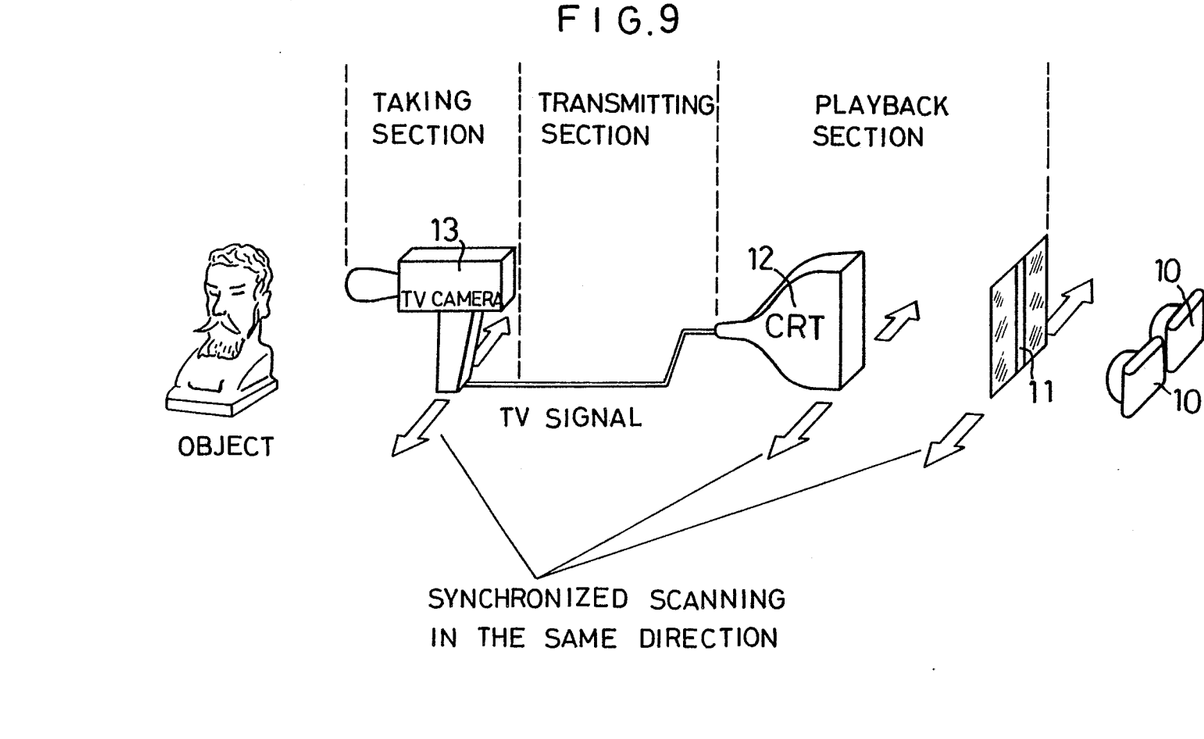
FIG. 9 is a perspective view illustrating the geometrical arrangement of the devices used in the experiment to confirm the effect of the present invention.

To clarify the effect of the three-dimensional photographing and playback device according to the present invention, the following experiments were made with the use of a device shown in FIG. 9.

As shown in FIG. 9, two cameras 10 were disposed in parallel with each other. And in front of them were disposed a slit 11, a CRT 12 and an ordinary TV camera 13 in this order. In front of the TV camera 13 was disposed an arbitrary three-dimensional object 14 to be photographed. In this case, the camera 13 is equivalent to the taking section of the present invention with respect to the images to be photographed for the same reason as explained in the system shown in FIG. 3. The slit 11 is disposed facing the center of the CRT 12, and is a vertically extending vertical slit. If the slit width is very narrow, it functions as a cylindrical lens, so in this case, a cylindrical lens is not required.

Taking conditions were as follows:
1. The distance between an image output screen of the CRT 12 and the taking film in camera 10 was constant, 70 cm.
2. The distance between the object 14 and the taking lens of the TV camera 13 was 43 cm.
3. The effective field of vision at the position of the object 14 (horizontal direction) was 22 cm.
4. The screen size of the CRT 12 in the horizontal direction was 7.6 cm.
5. The width of the slit 11 was 0.1 mm.
6. The distance between the image output screen of the CRT 12 and the slit 11 was 19.5 cm in Example 1. In this case, the shutter speed was 1 sec and iris was f 16.
7. In Example 2, the distance between the image output screen of the CRT 12 and the slit 11 was 14 cm. In this case, the shutter speed was 1 sec and iris was f 11.
8. The distance between synchronizing steps was 1 mm.
9. The film used for photographing was of a size 6×9 and of ISO 100.
10. A lens of focal length 100 mm and F 3.5 was used for the camera 10.

Under the conditions described above, the slit 11, the CRT 12 and the TV camera 13 were scanned in synchronization with each other in the same direction, and at each time of scanning, multiple exposure was made with the cameras 10. In both Example 1 and Example 2, the images obtaind by the right and left cameras 10 were those which could be obtained when the object 14 was seen from two different angles, and it was also confirmd by eyes that a three-dimensional image was obtained.

Between the images in Example 1 and Example 2, the difference in spatial magnification ratio of horizontal components to vertical components was observed. It was also confirmed that the spatial magnification ratio between a horizontal component and a vertical component in an output image can be adjusted by changing the distance between the CRT 12 and the slit 11, that is by changing the focal length f of the lens in the playback section shown in FIG. 8. Furthermore, it was also confirmed in examples that simultaneous observation of a reproduced image by plural persons was possible and that different images could be obtained by the horizontal movement of the viewpoint.

In the first embodiment of the present invention shown in FIGS. 1 and 2, a cylindrical lens is used as a lens for the playback section and a vertical slit is disposed in close contact with the cylindrical lens. Instead, a convex lens can be used as the lens for the playback section in combination with a pin hole.

Figure 10:
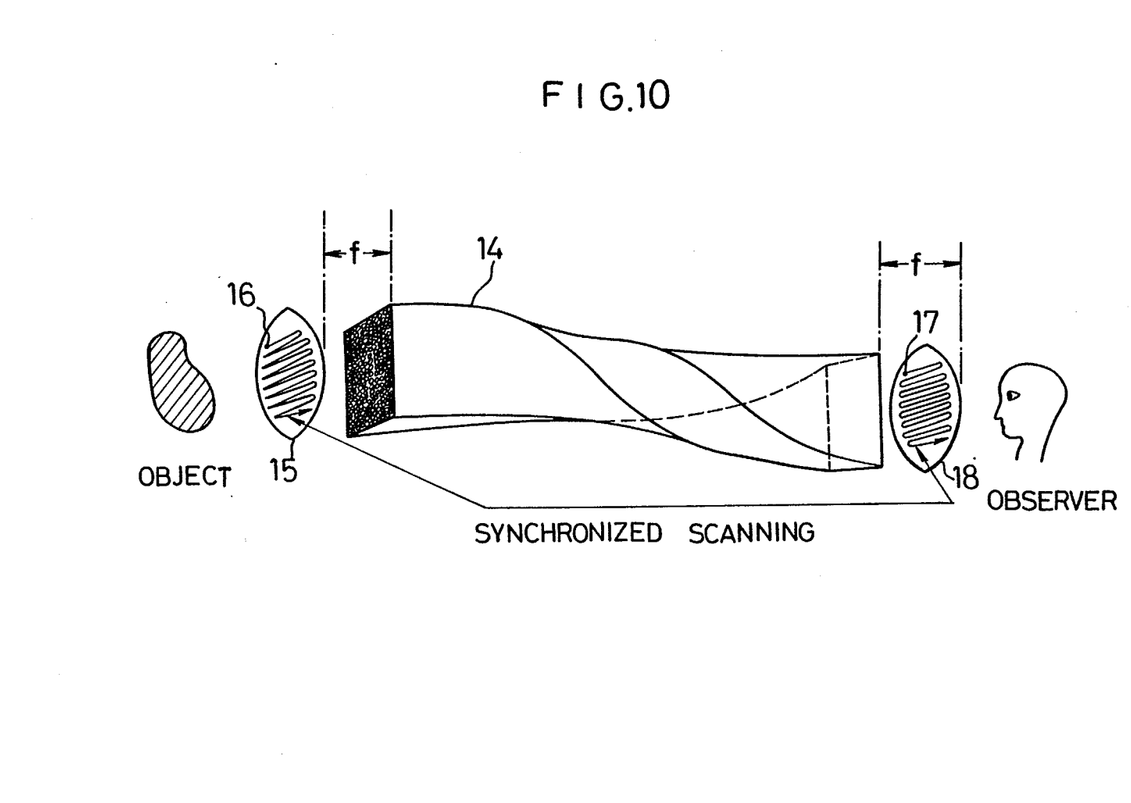
FIG. 10 is an overall view showing the constitution of another embodiment of the three-dimensional photographing and three-dimensional playback device by spatial time-sharing method according to the present invention.

More specifically, as shown in FIG. 10, a pin hole 16 on a lens 15 in the taking section and a pin hole 18 on a lens 17 in the playback section are scanned on the XY plane in synchronization with each other. The lens 15 in the taking section and the lens 17 in the playback section may be both convex lenses. In this case, an optical fiber cable 14 is used for the transmission of images so that there does not arise above-described problem of frequency band.

In the constitution of the first embodiment, the viewpoint movement is possible onlY in the horizontal direction, but in the constitution shown in FIG. 10, the viewpoint movement becomes possible in both the horizontal direction and the vertical direction.

The use of Fresnel lenses is not necessarily needed, if the lenses are of a comparativelY small size, respectively, ordinary convex lenses or cylindrical lenses can be used. The size of the lens, that is the size of the equipments in the taking section and playback section can be arbitrarily modified according to uses or the like.

To obtain a good quality image, it is necessary to make the distance between the pin hole(or slit) and the image pickup screen(or image output screen of CRT) equal to the focal length of the lens. Therefore, for example, when a convex lens of an ordinary shape is used, it is preferable to cut the convex lens into two pieces, and cement them together with a PLZT and a liquid crystal plate provided with a pin hole interposed so that the pin hole is positioned inside the convex lens. Or when a convex lens of which one surface is flat, is used, the above-described PLZT or liquid crystal plate provided with the pin hole may be closely attached to the flat surface. These ideas can be also applied to the cylindrical lens.

What is claimed is:

1. A three-dimensional photographing and three-dimensional playback device by spatial time sharing method comprising:
   a taking section composed of a convex lens, an image pickup screen and a pin hole movable on a surface or through an inner part of said convex lens, the distance between said convex lens and said image pickup screen being equal to the focal length of said convex lens; and
   a playback section composed of a lens member selected out of a cylindrical lens and a convex lens, an image output screen and a narrow opening member selected out of a vertical slit and a pin hole, which is movable on a surface or through an inner part of said lens member, the distance between said lens member and said image output screen being equal to the focal length of said lens member:

said pin hole in said taking section and said narrow opening member in said playback section being scanned in synchronization.

2. A three-dimensional photographing and three-dimensional playback device according to claim 1, wherein said pin hole in said taking section is movable in the horizontal direction, said lens member in said playback section is said cylindrical lens which is convex in the horizontal direction, said narrow opening member is said vertical slit which is movable in the horizontal direction, and said pin hole in said taking section and said vertical slit in said playback section are scanned in synchronization in the horizontal direction.

3. A three-dimensional photographing and three-dimensional playback device according to claim 1, wherein each of said pin hole and said vertical slit is composed of an electro-optical shutter which can be scanned at high speed in synchronization with each other.

4. A three-dimensional photographing and three-dimensional playback device according to claim 1, wherein said convex lens is composed of a Fresnel convex lens and said cylindrical lens is composed of a Fresnel cylindrical lens.

* * * * *

UNITED STATES PATENT AND TRADEMARK OFFICE
CERTIFICATE OF CORRECTION

PATENT NO. : 4,943,860

DATED : July 24, 1990

INVENTOR(S) : Tomohiko HATTORI

It is certified that error appears in the above-identified patent and that said Letters Patent is hereby corrected as shown below:

Col. 2, line  1, after "result"," insert -- o --.

Col. 3, line 68, change "S" to -- 3 --.

Col. 4, line 35, change "8" to -- 5 --;

line 58, correct the spelling of "use".

Col. 5, line  1, correct the spelling of "moving";

line 13, change "o" to -- c --;

line 28, change "onlY" to -- only --.

Col. 6, line 36, correct the spelling of "distortion".

Col. 8, line 23, change "onlY" to -- only --;

line 28, change "comparativelY" to -- comparatively --.

Col. 7, lines 22, 35, 38 and 59, delete "14".

Signed and Sealed this

Seventeenth Day of March, 1992

Attest:

HARRY F. MANBECK, JR.

*Attesting Officer*   *Commissioner of Patents and Trademarks*